United States Patent
Ren et al.

(10) Patent No.: US 7,935,256 B2
(45) Date of Patent: May 3, 2011

(54) METHOD FOR THE TREATMENT OF WASTE WATER FROM FLORFENICOL PRODUCTION

(75) Inventors: Hongqiang Ren, Nanjing (CN); Lili Ding, Nanjing (CN); Bingqing Xin, Nanjing (CN)

(73) Assignee: Nanjing University (CN)

( * ) Notice: Subject to any disclaimer, the term of this patent is extended or adjusted under 35 U.S.C. 154(b) by 0 days.

(21) Appl. No.: 12/373,054

(22) PCT Filed: Nov. 28, 2006

(86) PCT No.: PCT/CN2006/003206
§ 371 (c)(1),
(2), (4) Date: Jan. 9, 2009

(87) PCT Pub. No.: WO2008/055388
PCT Pub. Date: May 15, 2008

(65) Prior Publication Data
US 2009/0289007 A1  Nov. 26, 2009

(30) Foreign Application Priority Data
Nov. 7, 2006 (CN) .......................... 2006 1 0097421

(51) Int. Cl.
*C02F 3/30* (2006.01)
*C02F 9/14* (2006.01)
(52) U.S. Cl. ......... 210/605; 210/617; 210/631; 210/915
(58) Field of Classification Search .................. 210/605, 210/615, 616, 617, 630, 631, 252, 259, 915
See application file for complete search history.

(56) References Cited

U.S. PATENT DOCUMENTS

| | | | | |
|---|---|---|---|---|
| 5,290,451 A | * | 3/1994 | Koster et al. ................. | 210/605 |
| 5,296,147 A | * | 3/1994 | Koster et al. ................. | 210/605 |
| 5,744,041 A | * | 4/1998 | Grove ........................... | 210/602 |
| 5,922,204 A | * | 7/1999 | Hunter et al. ................. | 210/603 |
| 6,063,279 A | * | 5/2000 | Yamasaki et al. ............. | 210/605 |
| 6,228,264 B1 | * | 5/2001 | Yamasaki et al. ............. | 210/605 |
| 7,666,307 B2 | * | 2/2010 | Van Den Mooter et al. .. | 210/695 |
| 2003/0226803 A1 | | 12/2003 | Kamiya et al. | |

FOREIGN PATENT DOCUMENTS

| | | |
|---|---|---|
| CN | 1422818 | 6/2003 |
| JP | 2000000595 | 1/2000 |
| KR | 20040031894 | 4/2004 |
| KR | 20040099595 | 12/2004 |

* cited by examiner

*Primary Examiner* — Fred Prince
(74) *Attorney, Agent, or Firm* — Schmeiser, Olsen & Watts, LLP

(57) ABSTRACT

A method for the treatment of waste water from florfenicol production is provided, which mainly comprises the steps as follows: adding iron chips or steel slag to waste water from a copper salt workshop, regulating the pH value, filtering, then adding limestone, lime or Ca(OH)2 and having a solid-liquid separation; blending the treated waste water and waste water from a splitting workshop, oxidizing the residual reductive matter by ozone and removing NH3-N by blowing; blending the treated water and waste water from esterifying or florfenicol workshops and diluting the blended water, adding phosphate and microelement, regulating the pH value, then having an anaerobic treatment in an anaerobic reactor; diluting the treated waste water, then having an aerobic treatment in an aerobic reactor. The method also can comprise the steps as follows: blending the waste water from all workshops, adding phosphate and microelement, regulating the pH value, blending the treated waste water with recycling anaerobic water and having a settling treatment, then having an anaerobic treatment in an anaerobic granular sludge bed reactor, diluting the treated waste water and having an aerobic treatment in a SBR.

6 Claims, No Drawings

METHOD FOR THE TREATMENT OF WASTE WATER FROM FLORFENICOL PRODUCTION

TECHNICAL FIELD

This present invention relates to a method for treating an extensive antibacterial production wastewater, to be specifically chloramphenicol-production wastewater. As used throughout this specification, the wastewater is indented to any wastewater containing high concentration of organics, high strength of sulfate, high ammonia and heavy metal concentration during florfenicol production.

BACKGROUND ART

Florfenicol is a kind of chloramphenicol extensive antibacterial, formed chemically. The representative florfenicol wastewater is a sort of high strength organic industrial wastewater, containing high concentration of organics, salts, heavy metals, sulfate and ammonia. Similar industrial wastewaters are produced from the formation of: monosodium glutamate, lysine, molasses, midecamycin, terramycin and fatty acid, in which the BOD5 concentration is several million mg/L, TKN several thousand mg/L and sulfate several thousand mg/L.

One representative process of florfenicol formation is:

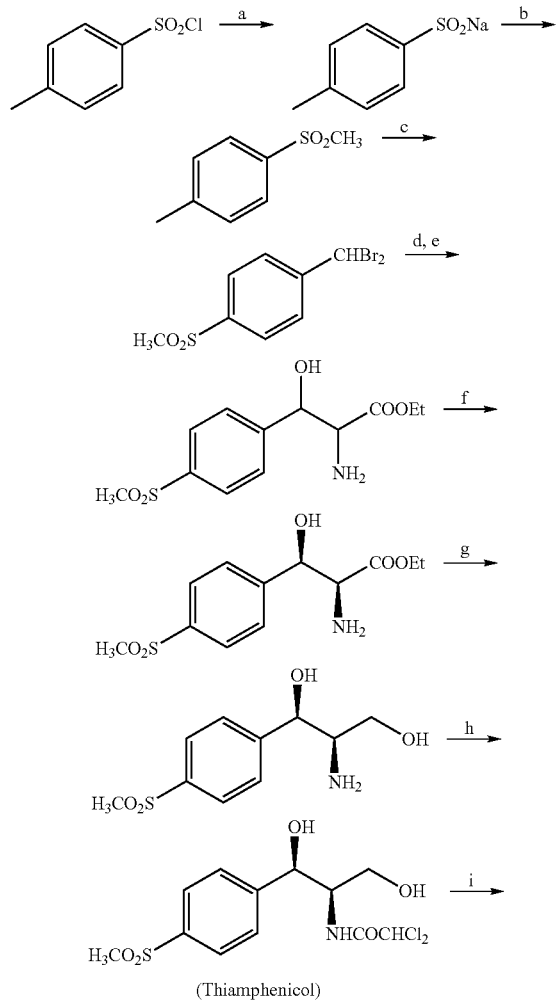

(Thiamphenicol)

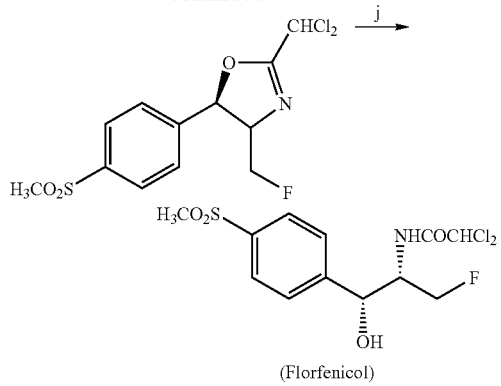

(Florfenicol)

Where (a) $NaSO_3$, $NaHCO_3$; (b) $CH_3SO_3Na$; (c) $Br_2$; (d) $NH_2CH_2COOH$, $CuSO_4$, NHOH; (e) EtOH, $H_2SO_4$; (f) Tartaric acid dissociation; (g) $NaBH_4$; (h) Dichloroacetonitrile, vitriol, ammonia saturated 2-propanol, 80° C., 2 h ; (i) FPA, THF, 100° C., 2 h; (j) Potassium acetic acid, methanol, 2-propanol , water, 10 h , pH 3.5-4.0.

In the process of florfenicol formation: (a-d) is indented to the section of copper-ion-containing wastewater comprising high concentration of copper ion, ammonia complex compound and sulfate; (e) is the wastewater of esterification section; (f-h) is the wastewater of dissociation section; (i-j) is the wastewater of florfenicol formation section.

For this kind of organic wastewater, using simple treatment method cannot the effluent discharge standards, so combining several treatment technologies is necessary. Four methods for treating industrial wastewater are: physical methods, chemical methods, physiochemical methods and biological methods. The last one is the most economical and efficient. Aerobic biological treatment is a popular technology for treating low strength organic wastewater, but for refractory organic wastewater, advanced chemical, physiochemical or biological pretreatment are needed to change the molecular structure of refractory material, reduce the concentration of pollutants, decrease the toxicity and increase the ratio of BOD5 to COD. After pretreatment, the wastewater becomes more decomposable, stable and high efficient performance could be achieved. Anaerobic biological process is usually used for treating high strength refractory organic wastewater. Yet, the presence of high concentrations of copper ion, sulfate and ammonia in florfenicol wastewater negatively affects the growth of anaerobic bacteria.

Main methods reported for treating high strength copper ion wastewater comprise: alkali neutralization, sulfide sodium sedimentation, iron slag replacement, extraction, electrolysis, membrane separation, resin or activated carbon adsorption, ion exchange, reverse osmosis, electrodialysis, evaporation condensation, biological treatment and so on. Physiochemical methods (such as ion exchange) need expensive investment and operation cost, while chemical methods such as neutralization and sedimentation are economical. Chemical sedimentation and biological methods have been reported to be the main technologies for treating copper-ion-containing pharmaceutical organic wastewater: adding $Na_2S$ to remove copper salt, adjusting pH by alkaline material, and then using hydrolysis and fermentation and aerobic treatment. Yet, high sulfate and ammonia concentration cannot be solved in this method and another problem is the remaining $S^{2-}$ in the solution will inhibit the activity of anaerobic bacteria after sedimentation reaction.

Main methods reported for treating high sulfate and organic concentration wastewater comprise: tail gas scrubbing and recycle mono-phase anaerobic process to reduce hydrogen sulfide toxicity; two phase anaerobic process for reducing hydrogen sulfide toxicity; ion salt sedimentation and/or inhibitors to control hydrogen sulfide toxicity to methanobacteria; photosynthetic bacteria treatment process. To treat the chloramphenicol-production wastewater, scarcely can these methods meet the effluent discharge standards.

DESCRIPTION OF INVENTION

1. Technical Problems Resolved in the Present Patent

The present patent relates to a method for treating florfenicol-production wastewater, especially intended to the wastewater consisting high concentrations of copper, sulfate and ammonia, pollutants inhibiting anaerobic reaction. The present patent applies assembled technology to remove main pollutants and recover heavy metal and the quality of the ultimate effluent meets the *Integrated Wastewater Discharge Standard* (GB8978-96).

2. Technical Precept

According to the water quality of florfenicol-production wastewater and the effluent discharge standards, two different treatment processes are provided in this present patent: method 1, for plant wastewater, containing high strength organic wastewater (COD6000-15000 mg/L) and needing strict discharge standards; Method 2, for Chemical Park or central wastewater treatment plant.

Method 1, a method for treating florfenicol-production wastewater comprises the steps of:

(1) Adding 0.5~10 g scrap iron or steel slag to 1 L of copper-ion-containing wastewater at pH 6~9; After sufficient reaction and filtration, adding limestone, lime or $Ca(OH)_2$ to the supernatant at pH 8~11 and separating solid and liquid;

(2) Mixing the separated liquid with the wastewater of dissociation section, then using ozone to oxidize the reductive compounds and strip the ammonia in the mixture;

(3) Mixing the wastewater wherein step (2) after ozone oxidization with the wastewater of esterification section and/or wastewater of florfenicol-formation section, and diluting it to 1500~10000 mg/L of COD concentration; adding 15~100 mg/L phosphate and 1-80 µg/L of trace elements and adjusting pH to 6.5~7.8 and then flowing into anaerobic reactor with hydrolic retention time 10~18 h;

(4) Diluting the anaerobic effluent wherein step (3) to 200~1000 mg/L of COD concentrations and adjusting pH to 6~8, and then flowing into aerobic reactor with retention time of 20~28 h.

Ozone, defined in Method 1 Step (2), is a kind of strong oxidants, with the ability of destroying color structures such as the diazo group and the —N=N-double bonds, degrading biological toxic materials, oxidizing organic pollutants to small molecules, removing partial COD and increasing the ratio of B/C, and efficiently improving the water quality for post treatment.

Anaerobic Granular Bed Reactor, defined in Method 1 Step (3), comprises the anaerobic reactors which are referred as anaerobic granular sludge reactor, UASB (Up-flow Anaerobic Sludge Blanket), IC (Internal Circulation) and EGSB (Expanded Granular Sludge Bed). In UASB, wastewater upflows with no stirrer, and a special three-phase separator equipped at the top of UASB. The reactor consists of the bottom water distribution area, and reaction area in the medium, and separation area at the top. Anaerobic granular sludge, activated sludge can be used. IC reactor is comprised of two UASBs, i.e. biogas separation can be controlled at two stages, with the bottom high organic loading rate and the top low loading rate. Liquid upflow rate is high (6-12 m/h) and the sludge bed is expanded. EGSB is a new type of UASB with sludge bed expanded high liquid upflow rate (6-12 m/h). In anaerobic granular bed reactor, granular sludge can be the biomass attached to the support materials (plastics or ceramics) or pure sludge granular.

The wastewater of dissociation, esterification and florfenicol formation sections contain high concentrations of recalcitrant organics (BOD) and ammonia.

Trace elements adding before pH adjustment, defined in Method 1 Step (3), include $CoCl_2.6H_2O$, $MnCl_2.4H_2O$, $ZnCl_2$; $NiCl_2.6H_2O$, $(NH_4)_6Mo_7O_{24}$.

The organic loading rate, in Method 1 Step (3), is 5~30 $kgCOD/(m^3d)$ and COD removal rate is 85-99%.

Aerobic reactors, defined in Method 1 Step (4), contain Biological Fluidized Bed Reactor (BFBR), Sequence Batch Reactor (SBR), Activated Sludge (AS) and Membrane Bioreactor (MBR).

Biological Fluidized Bed Reactor, is a high efficient wastewater treatment process with high expanded sludge bed (expansion rate 30-100%), and 1-2.5 mm of packing materials such as sand, activated sludge, polyethylene, and ceramics. Aeration can be pure oxygen or air.

One operation cycle of SBR (Sequencing Batch Reactor) comprises of five stages: feeding phase, reaction phase, settling phase, drawing phase and idle phase. According to the five sequences, the batch system can occur sequentially in the same bank or in five banks at the same time. In Step (4), organic loading rate is 0.5~5 $kgCOD/(m^3d)$ and COD removal rate >80%.

Method 2, a method for Central Wastewater Treatment Plant for treating florfenicol-production wastewater includes the steps of:

(1) Mixing the wastewater from each section and diluting to COD concentrations of 1500~6000 mg/L; adding 15~60 mg/L of phosphate and 1-80 µg/L of trace elements; adjusting pH to 7.0~8.0, and mixing with the effluent of anaerobic reactor in the ratio of 1:10~1:5; after removing the precipitants of reaction, flowing into the anaerobic granular bed reactor with hydraulic retention time of 12~24 h.

(2) Diluting the wastewater to COD concentration of 200~1000 mg/L adjusting pH to 6~8, and flowing it into SBR with loading rate at 1~5 $kgCOD/(m^3d)$, and controlling a operation cycle time within 12~18 h, aeration time within 6~10 h, and settling time within 5~8 h.

In Method 2 Step (3), add trace elements before pH adjustment. In Step (3) the recycling wastewater characteristics of anaerobic reactor effluent changes with the quality of anaerobic influent.

The organic loading rate, defined in Method 2 Step (3), is 5-24 $kgCOD/(m^3d)$, and COD removal rate 85-90%. In Method 2 Step (4), COD removal rate is higher than 80% and ammonia removal rate>85%.

In the Step (1) of Method 1 and Method 2, lime, limestone and/or $Ca(OH)_2$ are added, which react with heavy metals such as $Fe^{3+}$, $Cu^{2+}$ in the wastewater and form the precipitation of $Fe(OH)_3$, $Cu(OH)_2$ et al. The precipitates comprise of the harmless mixture of $Fe(OH)_3$, $Cu(OH)_2$, and calcium precipitates. After separation, the $Cu^{2+}$ concentration of the wastewater is ≦0.5 mg/L. Trace elements contain $CoCl_2 \cdot 6H_2O$ $MnCl_2 \cdot 4H_2O$, $ZnCl_2$, $NiCl_2 \cdot 6H_2O$, $(NH_4)_6Mo_7O_{24}$.

Anaerobic granular bed reactor, defined in Method 1 and Method 2, is the reactor using biofilm such as granular sludge, or support media (activated carbon, sand or polyethylene) as the type of microbial immobilization, up-flow or down-flow.

3. Advances

The present invention provides a method for treating florfenicol-production wastewater, including two processes according to the different chloramphenicol and intermediates production wastewater quality and the effluent discharge standards. Both of the effluents treated can meet the class one national standards of *Integrated Wastewater Discharge Standard* (GB8978-96). Most of the sulfate, ammonia, copper ion and COD can be removed, and heavy metals can be recycled. The present invention is suitable to treat other antibacterial production wastewater, especially chloromycetin production wastewater with good pollutants removal efficiency.

The present invention will be further described in the following examples, which are not intended to limit the scope of the invention.

EXAMPLE 1

Add 5 g scrap iron to 1 L of copper-ion-containing wastewater at pH 6 for 20 min, filtrate and add limestone, lime or $Ca(OH)_2$ to the supernatant to adjust pH 11. The heavy metals in the wastewater, such as $Fe^{3+}$, $Cu^{2+}$, settle down as $Fe(OH)_3$, $Cu(OH)_2$ et al. The precipitates comprise of the harmless mixture of $Fe(OH)_3$, $Cu(OH)_2$, and calcium precipitates. After separation, the $Cu^{2+}$ concentration of the wastewater is ≦0.5 mg/L. Mix the separated liquid with the wastewater of dissociation section, and use ozone to oxidize the reductive compounds and strip the ammonia in the mixture. Then mix the ozone oxidized wastewater with the wastewater of esterification section and florfenicol-formation section, and dilute it to 5000~10000 mg/L of COD concentration, add 50~100 mg/L phosphate and trace elements (μg/L): $CoCl_2 \cdot 6H_2O(80)$, $MnCl_2 \cdot 4H_2O(20)$, $ZnCl_2(2)$, $NiCl_2 \cdot 6H_2O$ (2), $(NH_4)_6Mo_7O_{24}$ (3). Adjust pH to 6.5~7.8 and then flow into UASB with hydraulic retention time 18 h. During the startup of reactor, the initial organic loading rate (OLR) is 0.1 kgCOD/$(m^3d)$. When COD removal rate is stable at 85% or higher, increase the loading rate by enhancing the quantity of influent or the influent concentration. The maximum OLR is controlled at 25 kgCOD/$(m^3d)$ and COD removal rate 85~99%. Finally, dilute the anaerobic effluent to 200~1000 mg/L of COD concentrations and adjust pH to 6~7, and then flowing into biological fluidized bed reactor with OLR of 0.5~5 kgCOD/$(m^3d)$, retention time of 20 h and the COD removal rate>80%. The effluent meets the class one national standards of *Integrated Wastewater Discharge Standard* (GB8978-96).

EXAMPLE 2

Add 10 g scrap iron to 1 L of copper-ion-containing wastewater at pH 6.8 for 10 min, filtrate and add limestone, lime or $Ca(OH)_2$ to the supernatant to adjust pH 8. The heavy metals in the wastewater, such as $Fe^{3+}$, $Cu^{2+}$, settle down as $Fe(OH)_3$, $Cu(OH)_2$ et al. The precipitates comprise of the harmless mixture of $Fe(OH)_3$, $Cu(OH)_2$, and calcium precipitates. After separation, the $Cu^{2+}$ concentration of the wastewater is ≦0.5 mg/L. Mix the separated liquid with the wastewater of dissociation section, and use ozone to oxidize the reductive compounds and strip the ammonia in the mixture. Then mix the ozone oxidized wastewater with the wastewater of esterification section and florfenicol-formation section, and dilute it to 5000~10000 mg/L of COD concentration, add 50~100 mg/L phosphate and trace elements (μg/L): $CoCl_2 \cdot 6H_2O(80)$, $MnCl_2 \cdot 4H_2O(20)$, $ZnCl_2(2)$, $NiCl_2 \cdot 6H_2O(2)$, $(NH_4)_6Mo_7O_{24}$ (3). Adjust pH to 6.5~7.8 and then flow into EGSB or IC with hydraulic retention time 10 h. During the startup of reactor, the initial organic loading rate (OLR) is 0.5 kgCOD/$(m^3d)$. When COD removal rate is stable at 85% or higher, increase the loading rate by enhancing the quantity of influent or the influent concentration. The maximum OLR is controlled at 30 kgCOD/$(m^3d)$ and COD removal rate 85~99%. Finally, dilute the anaerobic effluent to 200~500 mg/L of COD concentrations and adjust pH to 6~7, and then flowing into biological fluidized bed reactor with OLR of 0.5~5 kgCOD/$(m^3d)$, retention time of 24 h and the COD removal rate>80%. The effluent meets the class one national standards of *Integrated Wastewater Discharge Standard* (GB8978-96).

EXAMPLE 3

Add 0.5 g scrap iron to 1 L of copper-ion-containing wastewater at pH 9 for 20 min, filtrate and add limestone, lime or $Ca(OH)_2$ to the supernatant to adjust pH 10. The heavy metals in the wastewater, such as $Fe^{3+}$, $Cu^{2+}$, settle down as $Fe(OH)_3$, $Cu(OH)_2$ et al. The precipitates comprise of the harmless mixture of $Fe(OH)_3$, $Cu(OH)_2$, and calcium precipitates. After separation, the Cu 2+ concentration of the wastewater is ≦0.5 mg/L. Mix the separated liquid with the wastewater of dissociation section, and use ozone to oxidize the reductive compounds and strip the ammonia in the mixture. Then mix the ozone oxidized wastewater with the wastewater of esterification section and florfenicol-formation section, and dilute it to 1500~6000 mg/L of COD concentration, add 50~60 mg/L phosphate and trace elements (μg/L): $CoCl_2 \cdot 6H_2O(80)$, $MnCl_2 \cdot 4H_2O(20)$, $ZnCl_2(2)$, $NiCl_2 \cdot 6H_2O(2)$, $(NH_4)_6Mo_7O_{24}$ (3). Adjust pH to 6.8~7.5 and then flow into high efficient anaerobic granular bed reactor with hydraulic retention time 13 h. During the startup of reactor, the initial organic loading rate (OLR) is 0.5 kgCOD/$(m^3d)$. When COD removal rate is stable at 85% or higher, increase the loading rate by enhancing the quantity of influent or the influent concentration. The maximum OLR is controlled at 30 kgCOD/$(m^3d)$ and COD removal rate 85~99%. Finally, dilute the anaerobic effluent to 200~1000 mg/L of COD concentrations and adjust pH to 7~8, and then flowing into SBR with OLR of 0.5~5 kgCOD/$(m^3d)$, aeration time within 8~10 h, settling time within 2 h, and the COD removal rate>80%. The effluent meets the class one national standards of *Integrated Wastewater Discharge Standard* (GB8978-96).

EXAMPLE 4

Mix the wastewater from each section and dilute to COD concentrations of 1500~6000 mg/L. Adding 15~60 mg/L of phosphate and adjust pH to 7.0~8.0, and mix with the effluent of anaerobic reactor in the ratio of 1:10; after removing the precipitants of reaction, flowing into the anaerobic granular bed reactor with hydraulic retention time of 12 h, OLR of 5~24 kgCOD/$(m^3d)$ and COD removal rate of 85~90%. Dilute the wastewater to COD concentration of 200~1000 mg/L, adjust pH to 7.5~7.8, and flow into SBR with loading rate at 1~5 kgCOD/$(m^3d)$, and controlling a operation cycle time within 12 h, aeration time within 6 h, and settling time within 5 h. In aerobic stage, COD removal rate is>80% and ammonia removal rate>85%.

EXAMPLE 5

Mix the wastewater from each section and dilute to COD concentrations of 1500~6000 mg/L. Adding 15~60 mg/L of phosphate and adjust pH to 7.0~8.0, and mix with the effluent of anaerobic reactor in the ratio of 1:5; after removing the precipitants of reaction, flowing into the anaerobic granular bed reactor with hydraulic retention time of 12 h, OLR of 5~24 kgCOD/(m$^3$d) and COD removal rate of 85~90%. Dilute the wastewater to COD concentration of 200~1000 mg/L, adjust pH to 7.5~7.8, and flow into SBR with loading rate at 1~5 kgCOD/(m$^3$d), and controlling a operation cycle time within 18 h, aeration time within 8 h, and settling time within 8 h. In aerobic stage, COD removal rate is>80% and ammonia removal rate>85%.

EXAMPLE 6

Mix the wastewater from each section and dilute to COD concentrations of 1500~6000 mg/L. Adding 15~60 mg/L of phosphate and adjust pH to 7.0~8.0, and mix with the effluent of anaerobic reactor in the ratio of 1:5; after removing the precipitants of reaction, flowing into the anaerobic granular bed reactor with hydraulic retention time of 12 h, OLR of 5~24 kgCOD/(m$^3$d) and COD removal rate of 85~90%. Dilute the wastewater to COD concentration of 200~1000 mg/L, adjust pH to 7.5~7.8, and flow into SBR with loading rate at 1~5 kgCOD/(m$^3$d), and controlling a operation cycle time within 18 h, aeration time within 8 h, and settling time within 8 h. In aerobic stage, COD removal rate is>80% and ammonia removal rate>85%.

We claim:

1. A method for the treatment of waste water from florfenicol production comprising:
   (a) adding 0.5~10 g scrap iron or steel slag to 1 L of copper-ion-containing wastewater at pH 6~9; after sufficient reaction and filtering arriving at a filtered wastewater and adding at least one of limestone, lime and Ca(OH)2 to the filtered wastewater at pH 7~11 and separating solid and liquid;
   (b) mixing the liquid of step (a) with a wastewater of dissociation section, then using ozone to oxidize the reductive compounds and strip ammonia from the mixture;
   (c) mixing the wastewater of dissociation section of said step (b) after ozone oxidization with at least one of a wastewater of esterification section and a wastewater of florfenicol-formation section, and diluting it to 1500~10000 mg/L of COD concentration; adding 15~100 mg/L phosphate and 1-80 µg/L of trace elements and adjusting pH to 6.5~7.8 and then flowing into an anaerobic reactor with hydraulic retention time 10~18 h; and
   (d) diluting effluent from said anaerobic reactor to 200~1000 mg/L of COD concentrations and adjusting pH to 6~8, and then flowing into aerobic reactor with retention time of 20~28 h.

2. The method of claim 1, wherein said step (c) includes the anaerobic reactors selected from the group consisting of anaerobic granular sludge reactor, UASB (Upflow Anaerobic Sludge Blanket), IC(Internal Circulation) and EGSB(Expanded Granular Sludge Bed).

3. The method of claim 1, wherein the anaerobic reactor said step (d), are selected from the group consisting of biological fluidized bed reactor, SBR (Sequencing Biological Reactor), activated sludge, and biofilm reactor.

4. The method of claim 1, wherein said step (c) comprises adding trace elements before adjusting pH, which include CoCl2.6H2O, MnCl2.4H2O, ZnCl2, NiCl2.6H2O, (NH4)6Mo7O24.

5. The method of florfenicol-production wastewater treatment comprises:
   (a) mixing a wastewater from each section and diluting to COD concentrations of 1500~6000 mg/L; adding 15~60 mg/L of phosphate and 1-80 µg/L of trace elements; adjusting pH to 7.0~8.0, and mixing with effluent from an anaerobic reactor in the ratio of 1:10~1:5; after removing precipitants of reaction, flowing into an anaerobic granular bed reactor with hydraulic retention time of 12~24 h; and
   (b) diluting the wastewater to COD concentration of 200~1000 mg/L, adjusting pH to 6~8, and flowing it into SBR with loading rate at 1~5 kgCOD/(m3d), and controlling a operation cycle time within 12~18 h, aeration time within 6~10 h, and settling time within 5~8 h.

6. The method of claim 5, wherein said step (a) comprises adding the trace elements before adjusting pH, which include CoCl2.6H2O, MnCl2.4H2O, ZnCl2, NiCl2.6H2O, (NH4)6Mo7O24.

* * * * *